Figure 1:
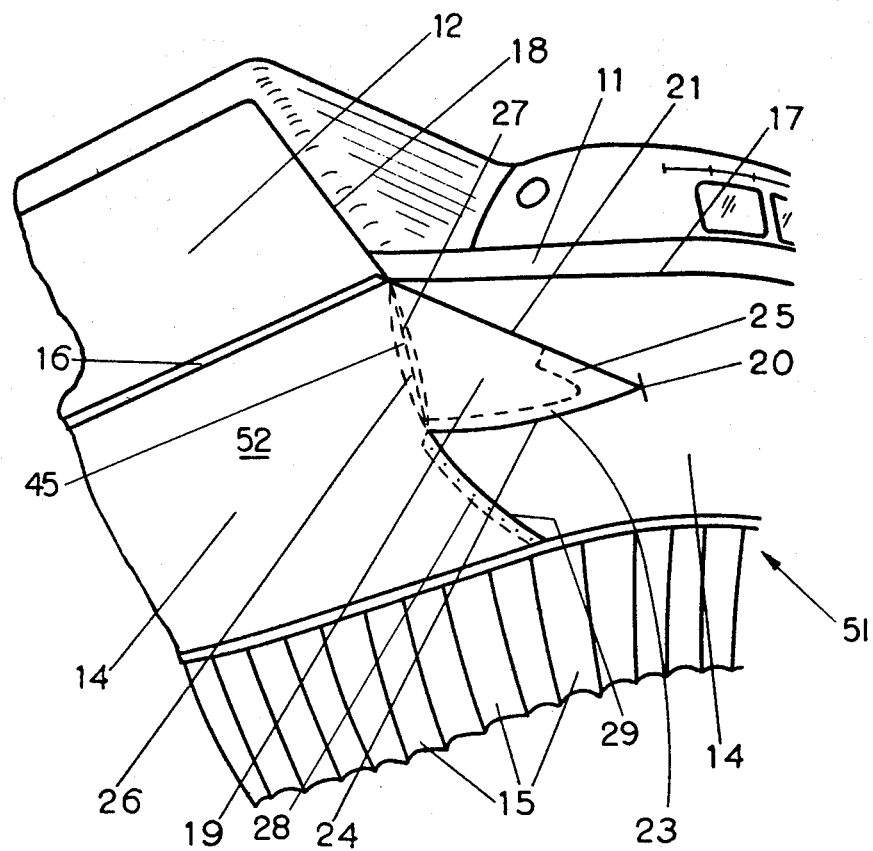

United States Patent
Riddle et al.

[15] 3,672,461
[45] June 27, 1972

[54] FLEXIBLE SKIRT ASSEMBLIES FOR AIR CUSHION VEHICLES

[72] Inventors: Lavis Albert Henry Riddle; Thomas Craig, both of East Cowes, Isle of Wight, England

[73] Assignee: British Hovercraft Corporation Limited, Yeovil, Somerset, England

[22] Filed: Oct. 8, 1969

[21] Appl. No.: 864,693

[30] Foreign Application Priority Data

Nov. 22, 1968 Great Britain ...................... 55,453/68

[52] U.S. Cl. ............................................ 180/127, 180/116
[51] Int. Cl. ........................................................... B60v 1/16
[58] Field of Search .................................. 180/116, 127, 128

[56] References Cited

UNITED STATES PATENTS

| 3,373,839 | 3/1968 | Hardy et al. | 180/128 |
| 3,414,077 | 12/1968 | Earl | 180/128 |
| 3,512,603 | 5/1970 | Crewe et al. | 180/127 |

Primary Examiner—A. Harry Levy
Attorney—Larson, Taylor and Hinds

[57] ABSTRACT

An air cushion vehicle having flexible skirts, the vehicle being provided with a cabin having a pivotally mounted access door arranged to act as a loading ramp, wherein a portion of the flexible skirt is attached to and passes over part of the access door.

11 Claims, 8 Drawing Figures

FLEXIBLE SKIRT ASSEMBLIES FOR AIR CUSHION VEHICLES

This invention relates to air cushion vehicles and more particularly to skirts for such vehicles.

Air cushion vehicles may have an enclosed space for payload, crew and operating equipment, this space being generally referred to throughout this specification as a cabin. In one form of an air cushion vehicle access to the cabin is provided by front and rear doors and the front door is arranged to act as a loading ramp. Skirts may be attached to the rigid structure of such vehicles at convenient locations.

It is an object of the invention to provide novel skirts for such vehicles.

According to the invention we provide an air cushion vehicle having a cabin, said cabin having at least one pivotally mounted access door, said door having a side pivotally mounted on the cabin, a free side opposite to the pivotally mounted side and two other free sides, and a skirt attached to said vehicle, wherein a portion of said skirt is attached to and passes over part of said access door or doors, said portion of the skirt having at least one division substantially parallel to a free side or free sides of the door.

The portion of the skirt attached to and passing over part of the door may include an inflatable envelope arranged so that upon the door being opened, the said portion of the skirt is movable with the door as it moves between a generally closed and a generally opened position.

From another point of view the portion of the skirt attached to and passing over said door may include sheets folded to form a plurality of substantially vertical corrugations, each corrugation having an outer arcuate part and two webs extending, one from each side of the arcuate part, towards the rigid part of the vehicle.

The envelope or the corrugations may be inflated by cushion pressure through part of the skirt and may act as a pneumatic buffer. Alternatively, the envelope or corrugations may be inflated from a source separate from the air cushion generation system.

The envelope or corrugations may be automatically deflated on the door being opened.

Figure 2:
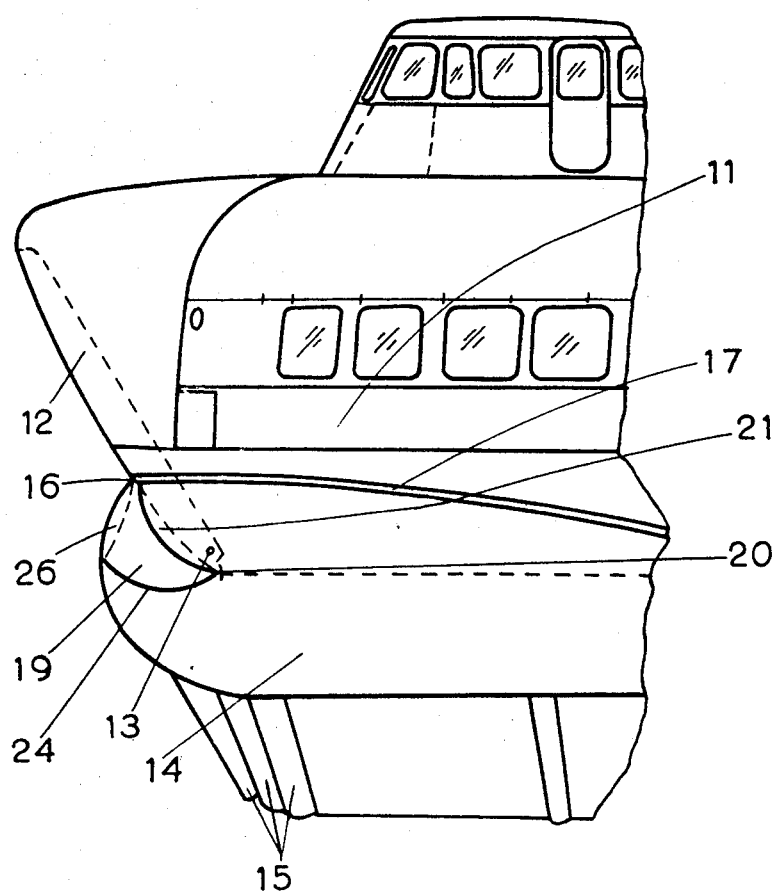
Figure 3:
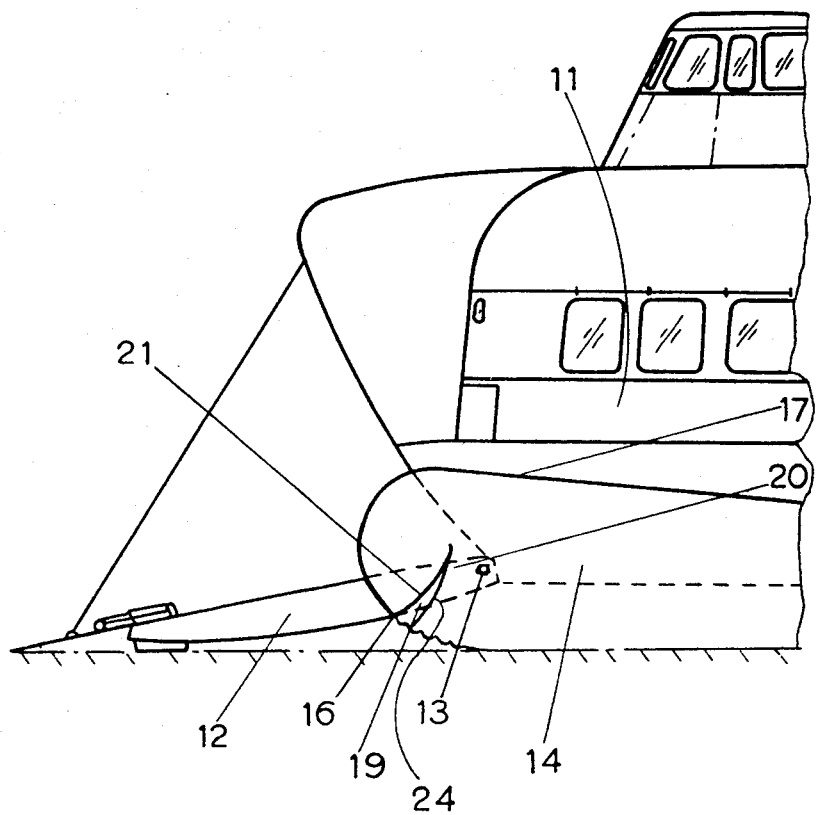
Figure 4:
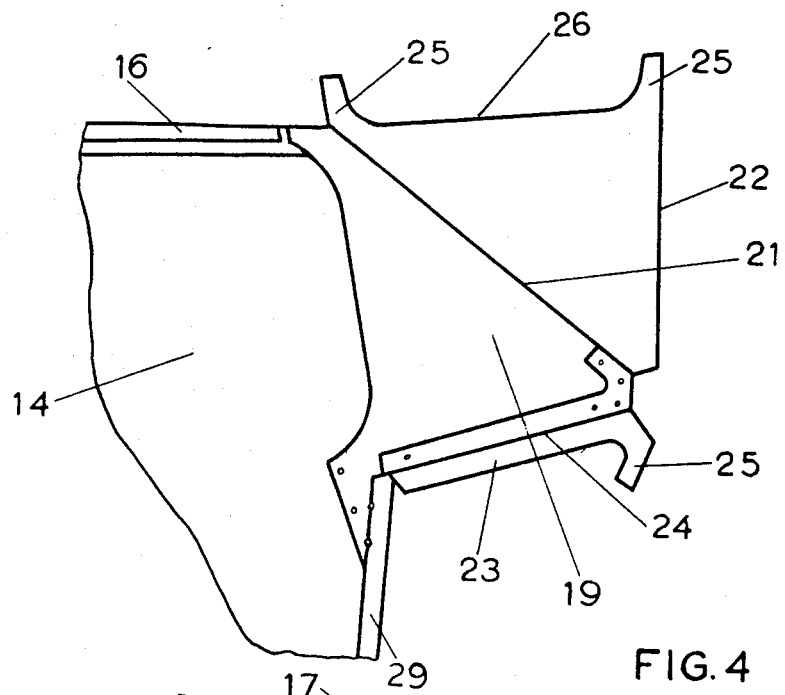
Figure 5:
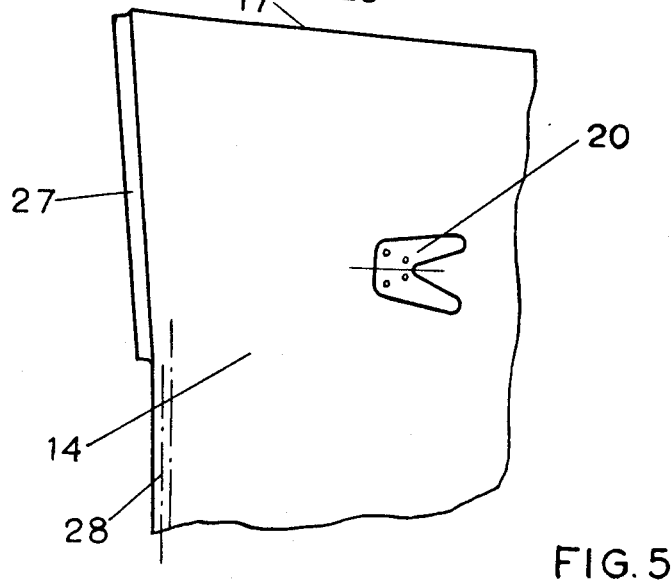
Figure 6:
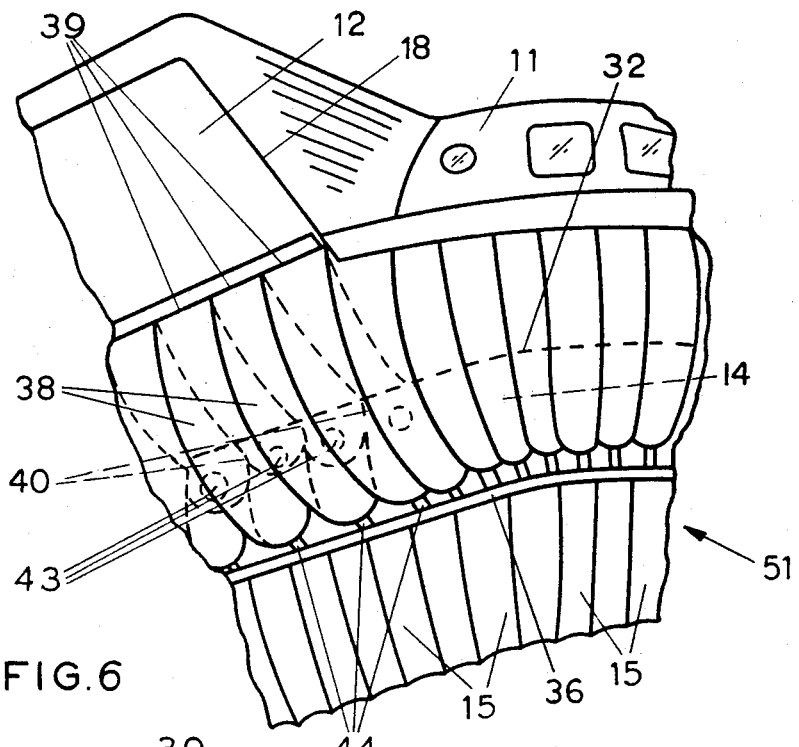
Figure 7:
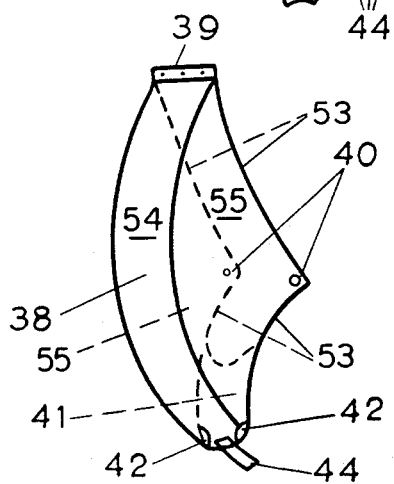
Figure 8:
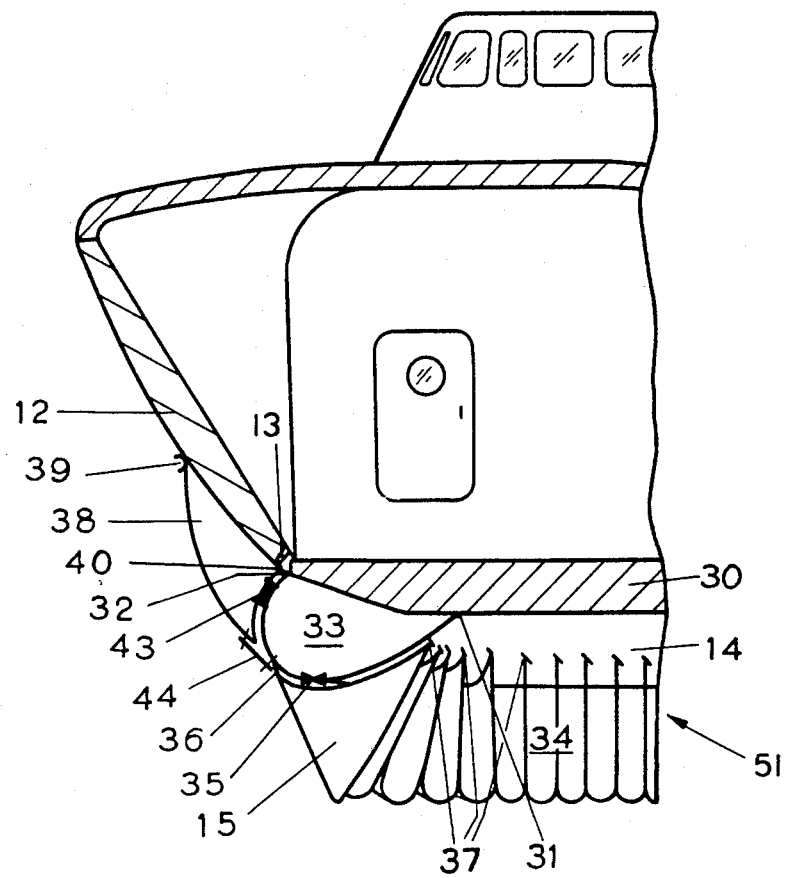

The invention will now be described, by way of example, with reference to the accompanying drawings, in which:

FIG. 1 is a perspective view of part of an air cushion vehicle according to a first embodiment of the invention, looking towards the port bow and showing a bow loading door in the raised, closed position, FIG. 2 is a side elevation of part of the air cushion vehicle illustrated in FIG. 1, FIG. 3 is a side elevation of part of the same air cushion vehicle with the bow loading door in the lowered, opened position, FIG. 4 illustrates the developed shape of that part of a flexible sheet forming an envelope attached to the bow loading door, FIG. 5 illustrates the developed shape of that part of a flexible sheet forming an envelope attached to the cabin side, FIG. 6 is a perspective view of part of an air cushion vehicle according to a second embodiment of the invention, looking towards the port bow, showing the bow loading door in the raised, closed position, FIG. 7 is a perspective view, on a larger scale, of one of the corrugations illustrated in FIG. 6, and FIG. 8 is a section of the bow part of the vehicle illustrated in FIG. 6, along its longitudinal center line.

Referring to the embodiment of the invention illustrated in FIGS. 1 to 5, an air cushion vehicle with a cabin having rigid sides 11 has a bow loading door 12. The bow loading door 12 is supported by a hinge 13 having a horizontal axis so that it may be moved between a raised, closed position (FIG. 1 and 2) and a lowered, opened position (FIG. 3).

The air cushion vehicle is provided with a flexible skirt 51 which includes a sheet 14 of flexible impermeable material, from which depends a plurality of discrete flexible segments 15, as described in U.S. Pat. No. 3,211,246.

An upwardly projecting extension 52 of the sheet 14 is provided on that part of the skirt which is below the door 12 and the cabin rigid sides 11 at each side of the door 12. This extension of the flexible sheet 14 is attached at outer attachment lines 16 on the door 12 and 17 on the cabin sides 11. The space between the door 12 and the sheet 14 is pressurized by air from the flexible skirt 51. The sheet 14 is partially divided by a slit 45 having an edge 27 in the plane substantially containing the arc of movement of the side 18 of the door 12. The slit 45 allows the door 12 to move between closed and opened positions without tearing the sheet 14.

A flap 19 is formed on the part of the sheet 14 which is attached to the door 12 and is attached at a point 20 to that part of the sheet 14 which is attached to the cabin side 11. When the space between the door 12 and the sheet 14 is pressurized the position of the attachment 20 is substantially at the point of intersection of the pivotal axis of the door hinge 13 and the surface of the sheet 14.

It is to be understood that although only one flap 19 and one sheet slit 45 has been described and illustrated in the drawings a similar flap and slit is to be provided in the plane of the arc of movement of the other parallel side of the door.

FIG. 4 illustrates the developed shape of a sheet of flexible impermeable material suitable for forming an inflatable flap 19. The material is folded back upon itself along a fold line to form a first side 21 of the flap. A second side 24 of the flap is formed by the edge 22 affixed to the strip 23 which is folded to form an airtight joint. Lugs 25 form strengthened areas for the attachment of the material of the sheet upon itself. The completed flap has a triangular form in which a first side 21 is airtight because it is folded, a second side 24 is airtight because of the fabricated airtight joint and the third side, along the edge 26, is open to allow the ingress of pressurized air.

FIG. 5 illustrates the developed shape of that part of the sheet of flexible impermeable material 14 which is attached to the cabin side 11 and contains the attachment point 20. Edge 27 provides the slit in the sheet 14. Edge 28 provides an attachment means for the corresponding edge 29 (FIG. 4) in that part of the sheet attached to the door 12.

In the operation of this embodiment, when the vehicle is stationary with the lift fans idling and the door is opened, the door compresses that portion of the skirt 51 which is beneath it and forms a ramp for vehicles. The slits 45 in the sheet 14 at the sides of the door allow this without the sheet tearing. When it is required to move the air cushion vehicle the door is raised to the closed position taking with it the part of the sheet 14 attached to the door and positioning the flaps 19 over the slits 45. The lift fans are speeded up and pressurized air for the air cushion is generated. The pressurized air inflates the flexible pressurized envelope and the space bounded by the impermeable sheet 14 and the door 12 and air enters each flap 19 by way of open side 26 to inflate the flap and urge the inner wall of the flap against sheet 14 so as to form a substantially airtight seal over the slit 45. The single fixing point 20 of the flap 19 to the sheet 14 allows water and spray percolating between the flap 19 and the sheet 14 to drain away.

FIGS. 6, 7 and 8 illustrate a second embodiment of the invention in which an air cushion vehicle has a rigid body including cabin sides 11 and a buoyancy compartment 30. A bow loading door 12 is hinged about a horizontal hinge 13 so that it may be lowered to act as a ramp for vehicles and passengers.

A skirt 51 includes sheet 14 of flexible impermeable material secured to the buoyancy compartment 30 at an inner fixing line 31 and an outer fixing line 32. The space enclosed by the sheet 14 and compartment 30 acts as part of a duct 33 to conduct pressurized air to the air cushion area 34, and has orifices 35 which allow pressurized air to pass from the duct 33 to the air cushion area 34.

Depending below the sheet 14 and attached thereto at points 36 and 37 are discrete flexible segments 15, in side by side relationship with each other, also forming part of the skirt 51.

Discrete flexible members 38 which are substantially U-shaped in transverse cross-section, are arranged above the sheet 14 of the skirt 51 around the door 12 and at least part of the cabin rigid sides 11. Each member 38 has an outer arcuate part 54 and two webs 55 extending one from each side of the arcuate part 54, as shown in FIG. 7.

Each member 38 is fixed to the vehicle at an upper fixing point 39 which is higher than the outer fixing line 32 of the sheet 14 on the buoyancy compartment 30, and at lower fixing points 40. In the case of the members 38 which cover a door 12 which opens as shown in FIG. 8, or which cover the cabin rigid sides 11, the fixing points 40 may coincide with the outer fixing line 32.

The members 38 are positioned on the door 12 so that there are a complete number of members 38 attached to the door and a web 55 of the member 38 which is nearest a side 18 of door 12 coincides with the said side 18. This web 55 is inflated against the web 55 of the first member 38 on the cabin side 11, nearest the door 12, when the members 38 are inflated but is not attached thereto so that these members 38 can separate when the door is opened.

The edges 53 of the webs 55 of members 38 are shaped to coincide with the shape of the flexible sheet 14 of the skirt 51 when it is inflated, and with the shape of door 12 or cabin rigid sides 11 which they abut against. In the case of a door 12 which opens on a horizontal hinge 13 the members 38 may be attached to the sheet 14 at a fixing point 44, as shown in FIG. 8. Parts of the edges 53 of a member 38 may be joined by a diaphragm 41 and water drain holes 42 may be provided. In operation, the members 38 are inflated by pressurized air passing from the duct 33 by way of holes 43 in the sheet 14 (FIG. 6).

In operation the members 38 are inflated and provide protection for the bow door and structure adjacent each side of the door. When the vehicle is at rest with the lift fans idling the bow door can be lowered and the members part easily so that those attached to the door are compressed beneath it. When it is required to move the vehicle, the door is raised to the closed position taking with it the members attached to it. As the lift fans are speeded up the cushion generating pressure inflates each member and holds the webs 55 of adjacent members against each other to form a unitary buffer.

When the members are attached to the sheet 14 at the third point 44 they act as a support for the skirt 51 to reduce any tendency for it to be dragged back under the vehicle, should the skirt 51 make contact with the surface over which the vehicle is operating.

The invention is not to be considered as limited to the examples described herein and illustrated in the drawings. Modifications can be made which are within the scope of the appended claims. For example, the U-shaped members 38, described with reference to FIGS. 6–8, could be used in conjunction with a door which opens on a vertical hinge. Further, the flaps need not be triangular in shape but may be of any suitable configuration. Again, when the skirt 51 and members 38 are inflated by a source other than cushion generating air this source may be controlled in conjunction with the operation of the door or doors. Also, a platform acting as a structural member may be provided instead of a buoyancy compartment.

We claim as our invention:

1. An air cushion vehicle having a cabin, the cabin having at least one pivotally mounted access door, said door having a side pivotally mounted on the cabin, a free side opposite to the pivotally mounted side and two other free sides, and a flexible assembly attached to said vehicle and depending downwardly as a skirt to bound at least part of a supporting cushion area, wherein a portion of said flexible assembly is attached to and passes over part of said access door or doors, said portion of the flexible assembly having a division substantially parallel to and generally in the arc of movement of each free side of the door over which it passes.

2. An air cushion vehicle as claimed in claim 1, wherein the space enclosed by said portion and said access door or doors is pressurizable.

3. An air cushion vehicle as claimed in claim 2, wherein at least one flexible flap is attached to said portion of the flexible assembly and is arranged so that movement of the door to the closed position urges the flap to a position where it covers the division.

4. An air cushion vehicle as claimed in claim 3, wherein said flap has an open end in communication with the pressurizable space so that the flap is inflatable.

5. An air cushion vehicle as claimed in claim 2 wherein said portion includes substantially vertical flexible corrugations, and wherein each corrugation includes an outer arcuate part and two webs extending, one from each side of the arcuate part, towards the rigid part of the vehicle.

6. An air cushion vehicle as claimed in claim 5, wherein the skirt of the flexible assembly includes a sheet of flexible impermeable material attached to the structure of the vehicle at inner and outer fixing lines to form an inflatable space, each corrugation having an upper fixing point above the outer fixing line.

7. An air cushion vehicle as claimed in claim 6, wherein each corrugation is attached to the rigid structure of the vehicle at upper and lower fixing points.

8. An air cushion vehicle as claimed in claim 7, wherein the corrugations are positioned around the rigid part of the vehicle so that the webs of two adjacent independently movable corrugations lie substantially in the arc of movement of a free edge of the door to form said division.

9. An air cushion vehicle as claimed in claim 6, wherein the pivot axis of said door is horizontal, and wherein each corrugation is attached to the rigid part of the vehicle at upper and lower fixing points and to the sheet boundary of the inflatable space.

10. An air cushion vehicle as claimed in claim 9, wherein the corrugations provide support for the inflatable envelope.

11. An air cushion vehicle as claimed in claim 2, wherein the door has a horizontal pivotal axis.

* * * * *